US010658751B2

(12) United States Patent
Dourado et al.

(10) Patent No.: US 10,658,751 B2
(45) Date of Patent: May 19, 2020

(54) SYSTEM AND METHOD FOR PHASE CALIBRATION OF AN ANTENNA ARRAY

(71) Applicant: Rohde & Schwarz GmbH & Co. KG, Munich (DE)

(72) Inventors: Fabricio Dourado, Munich (DE); Andreas Lechner, Rosenheim (DE); Hendrik Bartko, Unterhaching (DE); Adam Tankielun, Ottobrunn (DE); Corbett Rowell, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 519 days.

(21) Appl. No.: 15/629,239

(22) Filed: Jun. 21, 2017

(65) Prior Publication Data

US 2018/0375207 A1    Dec. 27, 2018

(51) Int. Cl.
| | | |
|---|---|---|
| *G01S 7/40* | (2006.01) | |
| *H01Q 3/26* | (2006.01) | |
| *H04B 17/12* | (2015.01) | |
| *H04B 17/00* | (2015.01) | |
| *H04B 17/21* | (2015.01) | |
| *H01Q 3/30* | (2006.01) | |

(52) U.S. Cl.
CPC ............... *H01Q 3/267* (2013.01); *G01S 7/40* (2013.01); *H01Q 3/2605* (2013.01); *H04B 17/0085* (2013.01); *H04B 17/12* (2015.01); *H04B 17/21* (2015.01); *H01Q 3/30* (2013.01)

(58) Field of Classification Search
CPC .................................. H01Q 3/267; G01S 7/40
USPC ......................................................... 342/174
See application file for complete search history.

(56) References Cited

U.S. PATENT DOCUMENTS 6,771,216 B2      8/2004  Patel et al.
10,128,894 B1 *  11/2018  O'Brien ................. H04B 17/14

FOREIGN PATENT DOCUMENTS

WO          2014197185 A1     12/2014

* cited by examiner

*Primary Examiner* — Peter M Bythrow
*Assistant Examiner* — Helena H Seraydaryan
(74) *Attorney, Agent, or Firm* — Ditthavong & Steiner, P.C.

(57) ABSTRACT

A system for phase calibration of an antenna array comprises at least two antenna elements. The system furthermore comprises a device under test comprising the antenna array, a plane wave converter, and a phase measuring unit. Whereas the device under test is configured to transmit or receive a test signal with spatially dependent phase, the plane wave converter is configured to convert the test signal with spatially dependent phase into a signal with constant phase. In addition to this, the device under test or the phase measuring unit is configured to derive calibration values for the phase calibration of the antenna array from the signal with constant phase.

18 Claims, 2 Drawing Sheets

SYSTEM AND METHOD FOR PHASE CALIBRATION OF AN ANTENNA ARRAY

TECHNICAL FIELD

The invention relates to a system and a method for phase calibration of an antenna array comprising at least two antenna elements.

BACKGROUND ART

Generally, in times of an increasing number of wireless applications employing antenna arrays such as multiple input multiple output (MIMO) devices, there is a growing need of a system and a method for phase calibration with respect to these antenna arrays in a most efficient manner in order to allow for a highly performant and low-cost calibration equipment for ensuring the correct functionality of said wireless applications.

U.S. Pat. No. 6,771,216 B2 relates to a method for calibrating a phased array antenna. Disadvantageously, with special respect to antenna array calibration, the foregoing patent document does not envisage any signal conversion into a signal with constant phase, which leaves the process of calibrating complex and inefficient.

Accordingly, there is a need to provide a system and a method for phase calibration of an antenna array, which makes the process of calibrating particularly efficient.

SUMMARY OF THE INVENTION

According to a first aspect of the invention, a system for phase calibration of an antenna array comprising at least two antenna elements is provided. The system comprises a device under test comprising the antenna array, a plane wave converter, and a phase measuring unit. Whereas the device under test is configured to transmit or receive a test signal with spatially dependent phase, the plane wave converter is configured to convert the test signal with spatially dependent phase into a signal with constant phase. In addition to this, the device under test or the phase measuring unit is configured to derive calibration values for the phase calibration of the antenna array from the signal with constant phase. Advantageously, phase calibration is performed over the air without any cable requirement. Further advantageously, for the purpose of phase calibration, no antenna has to be moved.

According to a first preferred implementation form of the first aspect, the device under test comprising the antenna array which comprises the at least two antenna elements is configured to sweep the test signal through different phases stepwise. Additionally or alternatively, the phase measuring unit is configured to sweep the test signal through different phases stepwise.

According to a further preferred implementation form of the first aspect, each phase-sweep step is triggering a sample in the device under test or in the phase measuring unit.

According to a further preferred implementation form of the first aspect, the device under test or the phase measuring unit is configured to derive several transfer coefficients from each phase-sweep step with corresponding measured phase values.

According to a further preferred implementation form of the first aspect, the several transfer coefficients form the basis for deriving calibration values with the aid of the device under test or the phase measuring unit.

According to a further preferred implementation form of the first aspect, a temperature difference of the at least two antenna elements against each other is lower than 7 degrees Celsius, preferably lower than 5 degrees Celsius, most preferably lower than 3 degrees Celsius.

According to a further preferred implementation form of the first aspect, while stepwise sweeping the phase of the test signal, a temperature difference of the at least two antenna elements against each other is lower than 7 degrees Celsius, preferably lower than 5 degrees Celsius, most preferably lower than 3 degrees Celsius.

According to a further preferred implementation form of the first aspect, a temperature based phase shift of the at least two antenna elements against each other is lower than 7 degrees phase shift, preferably lower than 5 degrees phase shift, most preferably lower than 3 degrees phase shift.

According to a further preferred implementation form of the first aspect, while stepwise sweeping the phase of the test signal, a temperature based phase shift of the at least two antenna elements against each other is lower than 7 degrees phase shift, preferably lower than 5 degrees phase shift, most preferably lower than 3 degrees phase shift.

According to a second aspect of the invention, a method for phase calibration of an antenna array of a device under test comprising at least two antenna elements is provided. The method comprises the steps of transmitting or receiving a test signal with spatially dependent phase with the aid of the device under test, converting the test signal with spatially dependent phase into a signal with constant phase with the aid of a plane wave converter, and deriving calibration values for the phase calibration of the antenna array from the signal with constant phase with the aid of the device under test or the phase measuring unit. Advantageously, phase calibration is performed over the air without any cable requirement. Further advantageously, for the purpose of phase calibration, no antenna has to be moved.

According to a first preferred implementation form of the second aspect, the method further comprises the step of sweeping the test signal through different phases stepwise with the aid of the device under test comprising the antenna array which comprises the at least two antenna elements. Additionally or alternatively, the method further comprises the step of sweeping the test signal through different phases stepwise with the aid of the phase measuring unit.

According to a further preferred implementation form of the second aspect, each phase-sweep step is triggering a sample in the device under test or in the phase measuring unit.

According to a further preferred implementation form of the second aspect, the method further comprises the step of deriving several transfer coefficients from each phase-sweep step with corresponding measured phase values with the aid of the device under test or the phase measuring unit.

According to a further preferred implementation form of the second aspect, the several transfer coefficients form the basis for deriving calibration values with the aid of the device under test or the phase measuring unit.

According to a further preferred implementation form of the second aspect, a temperature difference of the at least two antenna elements against each other is lower than 7 degrees Celsius, preferably lower than 5 degrees Celsius, most preferably lower than 3 degrees Celsius.

According to a further preferred implementation form of the second aspect, while stepwise sweeping the phase of the test signal, a temperature difference of the at least two antenna elements against each other is lower than 7 degrees Celsius, preferably lower than 5 degrees Celsius, most preferably lower than 3 degrees Celsius.

According to a further preferred implementation form of the second aspect, a temperature based phase shift of the at least two antenna elements against each other is lower than 7 degrees phase shift, preferably lower than 5 degrees phase shift, most preferably lower than 3 degrees phase shift.

According to a further preferred implementation form of the second aspect, while stepwise sweeping the phase of the test signal, a temperature based phase shift of the at least two antenna elements against each other is lower than 7 degrees phase shift, preferably lower than 5 degrees phase shift, most preferably lower than 3 degrees phase shift.

BRIEF DESCRIPTION OF THE DRAWING

Exemplary embodiments of the invention are now further explained with respect to the drawings by way of example only, and not for limitation. In the drawings.

DETAILED DESCRIPTION OF THE PREFERRED EMBODIMENTS

Figure 1:
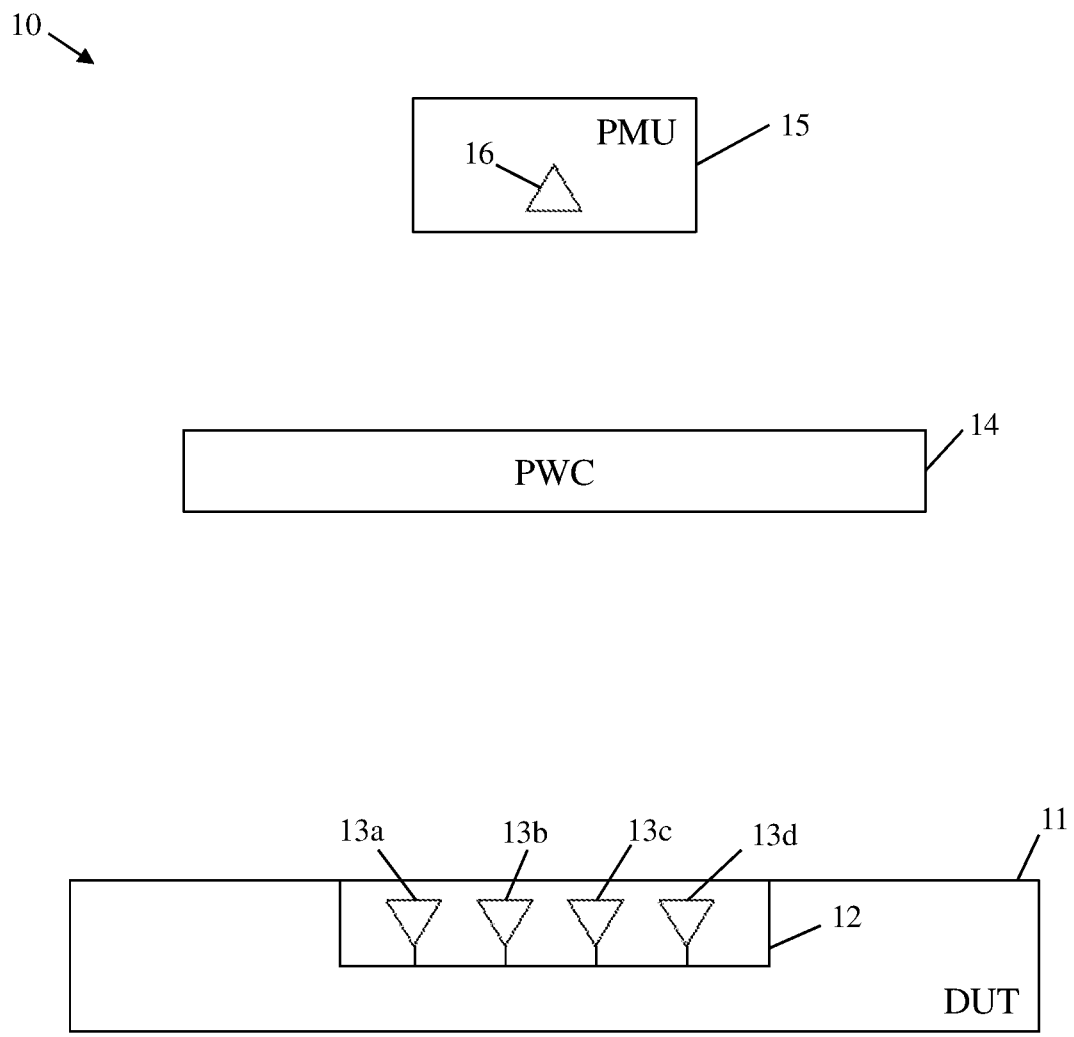
FIG. 1 shows a block diagram of an exemplary embodiment of the first aspect of the invention.

FIG. 1 illustrates an exemplary embodiment of a system 10 for phase calibration of an antenna array.

According to FIG. 1, said system 10 for phase calibration comprises a device under test 11 comprising generally at least two, in the shown example four, antenna elements 13a, 13b, 13c, 13d forming an antenna array 12.

Four antenna elements are shown for the purpose of illustration only. In practice there are often much more antenna elements in one antenna array. Furthermore, the system 10 comprises a plane wave converter 14 and phase measuring unit 15 comprising a test antenna 16 for wirelessly transmitting or receiving a test signal.

Whereas the device under test is configured to transmit or receive the test signal especially with spatially dependent phase, the plane waver converter 14 is configured to convert the test signal with spatially dependent phase into a signal especially with constant phase. In addition to this, the device under test 11 or the phase measuring unit 15 is configured to derive calibration values for the phase calibration of the antenna array 12 from the signal with constant phase.

Moreover, the device under test 11 is configured to sweep the test signal especially with spatially dependent phase through different phases stepwise. Additionally or alternatively, the phase measuring unit 15 is configured to sweep the test signal especially with spatially dependent phase through different phases stepwise.

In this context, each phase-sweep step is triggering a sample in the device under test 11. Additionally or alternatively, each phase-sweep step is triggering a sample in the phase measuring unit 15.

Furthermore, the device under test 11 is configured to derive several transfer coefficients from each phase-sweep step with corresponding measured phase values. Additionally or alternatively, the phase measuring unit 15 is configured to derive several transfer coefficients from each phase-sweep step with corresponding measured phase values.

In addition to this, said several transfer coefficients form the basis for deriving the above-mentioned calibration values with the aid of the device under test 11 or the phase measuring unit 15.

Moreover, a temperature difference of the antenna elements 13a, 13b, 13c, 13d against each other is lower than 7 degrees Celsius, preferably lower than 5 degrees Celsius, most preferably lower than 3 degrees Celsius.

In this context, preferably while stepwise sweeping the phase of the test signal, a temperature difference of the antenna elements 13a, 13b, 13c, 13d against each other is lower than 7 degrees Celsius, preferably lower than 5 degrees Celsius, most preferably lower than 3 degrees Celsius.

Additionally or alternatively, a temperature based phase shift of the antenna elements 13a, 13b, 13c, 13d against each other is lower than 7 degrees phase shift, preferably lower than 5 degrees phase shift, most preferably lower than 3 degrees phase shift.

In this context, especially while stepwise sweeping the phase of the test signal, a temperature based phase shift of the antenna elements 13a, 13b, 13c, 13d against each other is lower than 7 degrees phase shift, preferably lower than 5 degrees phase shift, most preferably lower than 3 degrees phase shift.

Furthermore, also within the scope of the invention, it should be mentioned that the device under test 11 can especially be seen as an active antenna system of combined radio frequency transceivers with antennas, which, especially in the case that the device under test transmits a test signal, leads to a phase and amplitude weighting of the test signal generated by the device under test 11.

In this context, the test signal especially comprises at least two signals from the at least two antennas of the antenna array, wherein at least one antenna is generally part of the device under test, whereas the other antennas may be either part of the device under test or separate reference antennas. Additionally, at least one of the antennas of the antenna array generating the test signal adds at least one, preferably at least two, phase shifts, especially phase shifts in time.

Moreover, it is noted that the plurality of the at least two antenna elements or the at least two antenna elements can be located either in the near-field or the far-field of the device under test. Advantageously, in this context, the plane wave converter is especially configured to transform a near-field characteristic into a far-field characteristic. Additionally or alternatively, the plane wave converter is especially configured to transform a far-field characteristic into a near-field characteristic.

Further advantageously, if the plurality of the at least two antenna elements or the at least two antenna elements are located in the near-field of the device under test, phase and amplitude weighting with respect to said plurality of the at least two antenna elements or regarding the at least two antenna elements are configured such that the test signal especially comprising a combined signal from said antenna elements has constant phase.

Furthermore, preferably by adding a phase shift in the device under test, a difference in the test signal indicates a phase shift. Advantageously, especially by adding several phase shifts, phase and amplitude differences can be derived with the aid of the device under test or the phase measuring unit and preferably calculated through a set of matrix equations.

In addition to this, the system, especially the device under test or the phase measuring unit, is preferably configured to generate a lookup table of phase and amplitude calibration coefficients or calibration values for each of the at least two antenna elements comprised by the device under test especially for different temperature conditions.

Advantageously, the inventive system, especially the phase measuring unit of the system, can simultaneously measure the calibration values, error vector magnitude, and equivalent isotropically radiated power especially for both individual and combined transceiver chains comprised by the device under test.

Figure 2:
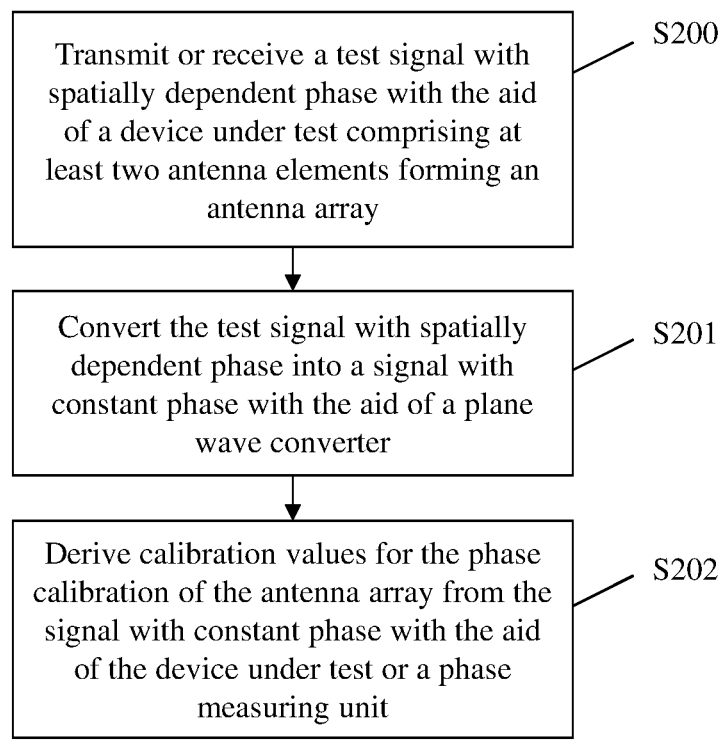
FIG. 2 shows a flow chart of an exemplary embodiment of the second aspect of the invention.

Now, with respect to FIG. 2, a flow chart of an exemplary embodiment of the inventive method is shown. In a first step S200, a test signal with spatially dependent phase is transmitted or received with the aid of a device under test comprising at least two antenna elements forming an antenna array. Then, in a second step S201, the test signal with spatially dependent phase is converted into a signal with constant phase with the aid of a plane wave converter. Finally, in a third step S202, calibration values for the phase calibration of the antenna array are derived from the signal with constant phase with the aid of the device under test or a phase measuring unit.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for phase calibration of an antenna array comprising at least two antenna elements, the system comprising:
   a device under test comprising the antenna array,
   a plane wave converter, and
   a phase measuring unit,
   wherein the device under test is configured to transmit or receive a test signal with spatially dependent phase,
   wherein the plane wave converter is configured to convert the test signal with spatially dependent phase into a signal with constant phase, and
   wherein the device under test or the phase measuring unit is configured to derive calibration values for the phase calibration of the antenna array from the signal with constant phase.

2. The system according to claim 1,
   wherein the device under test comprising the antenna array which comprises the at least two antenna elements is configured to sweep the test signal through different phases stepwise, or
   wherein the phase measuring unit is configured to sweep the test signal through different phases stepwise.

3. The system according to claim 2,
   wherein each phase-sweep step is triggering a sample in the device under test or in the phase measuring unit.

4. The system according to claim 2,
   wherein the device under test or the phase measuring unit is configured to derive several transfer coefficients from each phase-sweep step with corresponding measured phase values.

5. The system according to claim 4,
   wherein the several transfer coefficients form the basis for deriving calibration values with the aid of the device under test or the phase measuring unit.

6. The system according to claim 1,
   wherein a temperature difference of the at least two antenna elements against each other is lower than 7 degrees Celsius, preferably lower than 5 degrees Celsius, most preferably lower than 3 degrees Celsius.

7. The system according to claim 2,
   wherein while stepwise sweeping the phase of the test signal, a temperature difference of the at least two antenna elements against each other is lower than 7 degrees Celsius, preferably lower than 5 degrees Celsius, most preferably lower than 3 degrees Celsius.

8. The system according to claim 1,
   wherein a temperature based phase shift of the at least two antenna elements against each other is lower than 7 degrees phase shift, preferably lower than 5 degrees phase shift, most preferably lower than 3 degrees phase shift.

9. The system according to claim 2,
   wherein while stepwise sweeping the phase of the test signal, a temperature based phase shift of the at least two antenna elements against each other is lower than 7 degrees phase shift, preferably lower than 5 degrees phase shift, most preferably lower than 3 degrees phase shift.

10. A method for phase calibration of an antenna array of a device under test comprising at least two antenna elements, the method comprising the steps of:
    transmitting or receiving a test signal with spatially dependent phase with the aid of the device under test,
    converting the test signal with spatially dependent phase into a signal with constant phase with the aid of a plane wave converter, and
    deriving calibration values for the phase calibration of the antenna array from the signal with constant phase with the aid of the device under test or a phase measuring unit.

11. The method according to claim 10,
    wherein the method further comprises the step of sweeping the test signal through different phases stepwise with the aid of the device under test comprising the antenna array which comprises the at least two antenna elements, or
    wherein the method further comprises the step of sweeping the test signal through different phases stepwise with the aid of the phase measuring unit.

12. The method according to claim 11,
    wherein each phase-sweep step is triggering a sample in the device under test or in the phase measuring unit.

13. The method according to claim 11,
    wherein the method further comprises the step of deriving several transfer coefficients from each phase-sweep step with corresponding measured phase values with the aid of the device under test or the phase measuring unit.

14. The method according to claim 13,
    wherein the several transfer coefficients form the basis for deriving calibration values with the aid of the device under test or the phase measuring unit.

15. The method according to claim 10,
wherein a temperature difference of the at least two antenna elements against each other is lower than 7 degrees Celsius, preferably lower than 5 degrees Celsius, most preferably lower than 3 degrees Celsius.

16. The method according to claim 11,
wherein while stepwise sweeping the phase of the test signal, a temperature difference of the at least two antenna elements against each other is lower than 7 degrees Celsius, preferably lower than 5 degrees Celsius, most preferably lower than 3 degrees Celsius.

17. The method according to claim 10,
wherein a temperature based phase shift of the at least two antenna elements against each other is lower than 7 degrees phase shift, preferably lower than 5 degrees phase shift, most preferably lower than 3 degrees phase shift.

18. The method according to claim 11,
wherein while stepwise sweeping the phase of the test signal, a temperature based phase shift of the at least two antenna elements against each other is lower than 7 degrees phase shift, preferably lower than 5 degrees phase shift, most preferably lower than 3 degrees phase shift.

* * * * *